Patented Jan. 2, 1951

2,536,560

UNITED STATES PATENT OFFICE 2,536,560

VEHICLE ENGINE MOUNTING BENEATH DRIVER'S COMPARTMENT

Walter Limon, Luton, England, assignor to Commer Cars Limited, Luton, England

Application January 30, 1946, Serial No. 644,346
In Great Britain December 20, 1944

Section 1, Public Law 690, August 8, 1946
Patent expires December 20, 1964

7 Claims. (Cl. 180—89)

This invention relates to motor, and particularly commercial, vehicles and has for its object to provide an improved mounting and arrangement of the power unit which enables this unit and the driver's compartment or cabin to occupy the minimum space, without cramping, and makes available increased carrying space behind the driver and the maximum possible seating and foot space in the driver's compartment and this with the use of existing and orthodox multi-cylinder engines, whether petrol or Diesel engines.

A further object of the invention is to provide an arrangement of the power unit of a motor vehicle which enables the engine to be located immediately beneath the seat of the driver's compartment or cabin.

A further object of the invention is to provide an arrangement of a liquid-cooled multi-cylinder internal combustion engine driving a motor vehicle such that the engine is located beneath the seat of the driver's compartment or cabin and the outlet for cooling liquid is situated beneath the floor thereof.

A further object of the invention is to provide an arrangement of an internal combustion engine for driving a vehicle enabling the cylinder head to be accessible by removing the driver's seat and wherein the hottest part of the engine including the exhaust manifold is remote from the driver's seat so that direct radiation of heat from such part to the cabin is avoided.

A further object is to enable the engine cylinder head to be brought sufficiently low to enable the water outlet pipe from the engine to be located entirely beneath the floor boards of the driver's compartment.

A further object is to enable the maximum space possible to be utilized for seating accommodation and to enable the floor space to be kept clear for the necessary control elements.

Another object is to provide an arrangement wherein the transference of heat from the engine to the driver's seat and cab is generally prevented, and further to enable a supply of clean, warm air to be admitted to the cabin if required.

Figure 1:
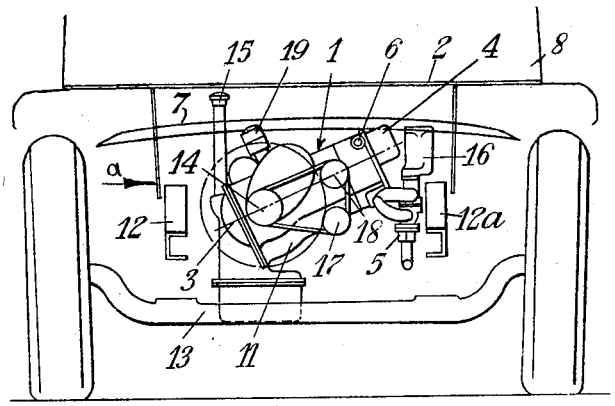
Figure 2:
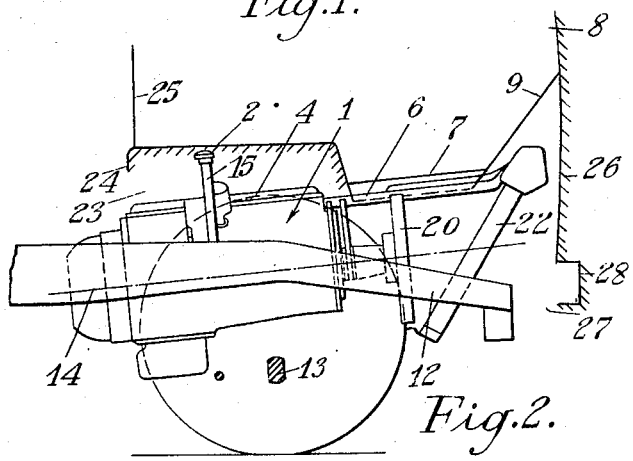
Figure 3:
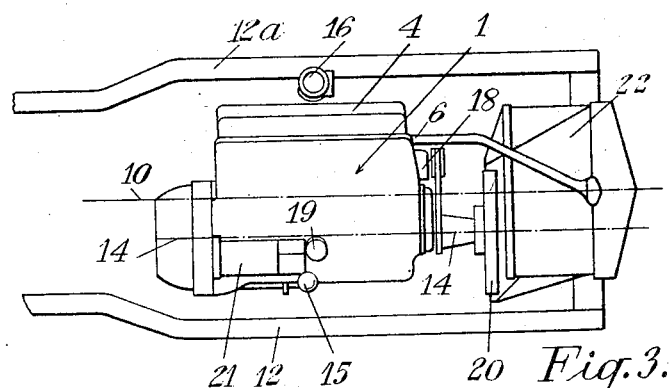

In the accompanying drawings, which are diagrammatic in character:

Figure 1 is a view looking on the front end of a vehicle and showing the disposition of the power unit according to the invention, Figure 2 is a side view looking in the direction of the arrow $a$ in Figure 1, and Figure 3 is a plan view of Figure 2.

A convenient mode of carrying the invention into effect is illustrated in the drawings, which show in diagrammatic form a commercial motor vehicle equipped with an orthodox multi-cylinder, in-line, overhead valve internal combustion engine 1. The engine or power unit 1 is mounted upon the vehicle framework so as to be located entirely beneath the driver's seat 2. The disposition of the power unit 1 is such that its longitudinal axis 3 (Figure 1) is inclined at an angle of approximately 24° to the horizontal. The engine cylinder head and cover plate 4 is upwardly directed towards one side of the vehicle and the exhaust manifold 5 is downwardly directed from the underneath side of the cylinder block remote from the driver's seat.

The inclined arrangement, which is not necessarily limited to an overhead valve engine, but may be applied, for example, to a side valve engine, is such that the engine so closely approaches the horizontal that the water outlet pipe 6 from the engine can be located entirely beneath the floor boards 7 (Figures 1 and 2) of the driver's compartment or cabin 8, the toe boards of the later being indicated at 9 in Figure 2. The floor boards 7 are slightly curved in front elevation as shown in Figure 1.

The power unit is, in general, symmetrically disposed with respect to the centre line 10 (Figure 3) of the vehicle framework and has its crankcase 11 lowermost and inclined towards one longitudinal member 12 of the vehicle chassis, the cylinder head and cover plate 4 being located above the crankcase on the opposite side of the said centre line 7 and being directed towards the opposite longitudinal member 12a of the vehicle chassis.

The power unit is located entirely in the space bounded on opposite sides by the forward end portions of the longitudinal members of the chassis frame and at the top and bottom by the seat 2 and front wheel axle 13 respectively.

The arrangement is such that the cylinder head is sufficiently low as to permit the water pipe 6 from the engine to be installed under the floor boards 7 of the driver's cabin 8 and accordingly the latter is kept free of all obstruction. Also the arrangement permits the provision within the driver's cabin of centrally placed change speed and hand brake controls and thereby alows the use of optional right or left hand drives.

The engine shaft which is represented by its centre line 14 as seen in Figures 2 and 3 is located on one side of the centre line 10 of the vehicle and in spaced relation thereto, and in plan this shaft lies parallel to the adjacent longitudinal side frame member 12.

The oil filler is indicated at 15, the carburettor at 16, the dynamo at 17, the water pump at 18, the distributor at 19, the fan at 20 and the starter motor at 21 (Figure 3). The radiator is indicated at 22.

The space 23 (Figure 2) between the driver's seat and the top of the engine serves to provide for the adequate insulation above mentioned while the provision of an opening 24 in the rear wall 25 of the driver's cabin and beneath the driver's seat provides for the maintaining, by the fan 20, of a free air flow through a grill 26 at the front of the vehicle and through an opening 27 (Figure 2) beneath the front bumper 28, which air flow passes over the power unit and serves to carry the heat away from the driver's cabin and through the aforesaid opening 24. The location of the exhaust manifold 5 beneath the cylinder head and cover plate 4 is attendant with the advantage that said air flow is able to transfer the heat from the hottest part of the engine away from the driver's seat.

I claim:

1. A motor vehicle comprising, in combination, a front wheel axle, longitudinal chassis side frame members, a driver's compartment or cabin, a driver's seat therein, a multi-cylinder, in-line, internal combustion engine mounted with the axes of its cylinders at a small angle to the horizontal immediately beneath the said seat, the cylinder head part being directed upwardly towards one side of the vehicle, and the crank case part being downwardly inclined towards the opposite side of the vehicle and located in the space between the longitudinal chassis frame members so as to utilize fully the space between the driver's seat and the front wheel axle, and an exhaust manifold located on the underside of the inclined engine and at the same side of the vehicle as the cylinder head part.

2. A motor vehicle comprising, in combination, a front wheel axle, longitudinal chassis side frame members, a driver's compartment or cabin, a driver's seat therein, a multi-cylinder, in-line, internal combustion engine mounted with the axes of its cylinders at an angle in the neighbourhood of 24° to the horizontal immediately beneath the said seat, the cylinder head part being inclined upwardly towards one side of the vehicle, and the crank case part being downwardly inclined towards the opposite side of the vehicle and located in the space between the longitudinal chassis frame members so as to utilize fully the space between the driver's seat and the front wheel axle, an exhaust manifold located on the underside of the inclined engine and at the same side of the vehicle as the cylinder head part, and a cooling liquid outlet located on the upper side of the engine immediately beneath the floor of the driver's compartment or cabin.

3. A motor vehicle comprising, in combination, a front wheel axle, longitudinal chassis side frame members, a driver's compartment or cabin, a driver's seat therein, a multi-cylinder, in-line, internal combustion engine mounted with the axes of its cylinders at a small angle to the horizontal immediately beneath the said seat, the cylinder head part being inclined upwardly towards one side of the vehicle and being disposed in a space bounded by the front of the seat and the rear of the compartment or cabin, and the crank case part being downwardly inclined towards the opposite side of the vehicle and located in the space between the longitudinal chassis frame members so as to utilize fully the space between the driver's seat and the front wheel axle, and an exhaust manifold located on the underside of the inclined engine and at the same side of the vehicle as the cylinder head part.

4. A motor vehicle comprising, in combination, a front wheel axle, longitudinal chassis side frame members, a driver's compartment or cabin, a driver's seat therein, a multi-cylinder, in-line, internal combustion engine mounted with the axes of its cylinders at a small angle to the horizontal immediately beneath the said seat, the engine shaft being located laterally of the central longitudinal axis of the chassis and the cylinder head part being directed upwardly towards one side of the vehicle, the crank case part being downwardly inclined towards the opposite side of the vehicle and located in the space between the longitudinal chassis frame members so as to utilize fully the space between the driver's seat and the front wheel axle, and an exhaust manifold located on the underside of the inclined engine and at the same side of the vehicle as the cylinder head part.

5. A motor vehicle comprising, in combination, a front wheel axle, longitudinal chassis side frame members, a driver's compartment or cabin having a floor and inclined toe boards, a driver's seat therein, a multi-cylinder, in-line, internal combustion engine mounted with the axes of its cylinders at a small angle to the horizontal immediately beneath the said seat, the cylinder head part being directed upwardly towards one side of the vehicle, and the crank case part being downwardly inclined towards the opposite side of the vehicle and located in the space between the longitudinal chassis frame members so as to utilize fully the space between the driver's seat and the front wheel axle, an exhaust manifold located on the underside of the inclined engine and at the same side of the vehicle as the cylinder head part, an inclined radiator located at the front of the vehicle remote from the engine and disposed partly below the inclined toe boards and partly below the compartment floor, and a fan located between the inclined radiator and the engine.

6. A motor vehicle comprising, in combination, a front wheel axle, longitudinal chassis side frame members including undropped portions thereof above said wheel axle, a driver's compartment or cabin, a driver's seat therein, a multi-cylinder, in-line, internal combustion engine mounted with the axes of its cylinders at a small angle to the horizontal immediately beneath the said seat, the cylinder head part being directed upwardly towards one side of the vehicle, and the crank case part being downwardly inclined towards the opposite side of the vehicle and located in the space between the undropped portions of the longitudinal chassis frame members so as to utilize fully the space between the driver's seat and the front wheel axle.

7. A motor vehicle according to claim 6, in which the cylinder head part of the engine is disposed in a space bounded by the front of the driver's seat and the rear of the compartment or cabin.

WALTER LIMON.

REFERENCES CITED

The following references are of record in the file of this patent:

UNITED STATES PATENTS

| Number | Name | Date |
|---|---|---|
| 780,746 | Harrington | Jan. 24, 1905 |
| 907,884 | Richards | Dec. 29, 1908 |
| 987,358 | Gruenfeldt | Mar. 21, 1911 |
| 1,648,505 | Persu | Nov. 8, 1927 |
| 1,943,665 | Freeman | Jan. 16, 1934 |
| 2,035,212 | Alborn | Mar. 24, 1936 |

FOREIGN PATENTS

| Number | Country | Date |
|---|---|---|
| 386,436 | Germany | Dec. 8, 1923 |
| 498,613 | Great Britain | Jan. 11, 1939 |